United States Patent [19]

Bruestle

[11] 3,776,324

[45] Dec. 4, 1973

[54] AUTOMATIC LOADER FOR CARTONS

[76] Inventor: Andrew W. Bruestle, 5812 N. 6th St., Philadelphia, Pa. 19120

[22] Filed: Nov. 16, 1972

[21] Appl. No.: 307,169

[52] U.S. Cl............ 177/116, 177/53, 177/55, 177/59, 177/110, 177/114
[51] Int. Cl.. G01g 13/02, G01g 13/24, G01g 13/16
[58] Field of Search............ 177/55, 56, 59, 85, 177/105, 108, 110, 114, 116, 53; 222/77

[56] References Cited
UNITED STATES PATENTS

| 2,443,350 | 6/1948 | Gilbert et al........................ 177/59 |
| 1,376,138 | 4/1921 | Curran et al................. 177/110 UX |
| 3,095,055 | 6/1963 | McLauchlan........................ 177/53 |

Primary Examiner—George H. Miller, Jr.
Attorney—Richard S. Shreve, Jr.

[57] ABSTRACT

A machine provided with means for automatically feeding bulk commodities to a delivery spout, means for automatically weighing the material delivered at said spout and means for automatically loading the desired weight of material into cartons.

3 Claims, 7 Drawing Figures

PATENTED DEC 4 1973  3,776,324
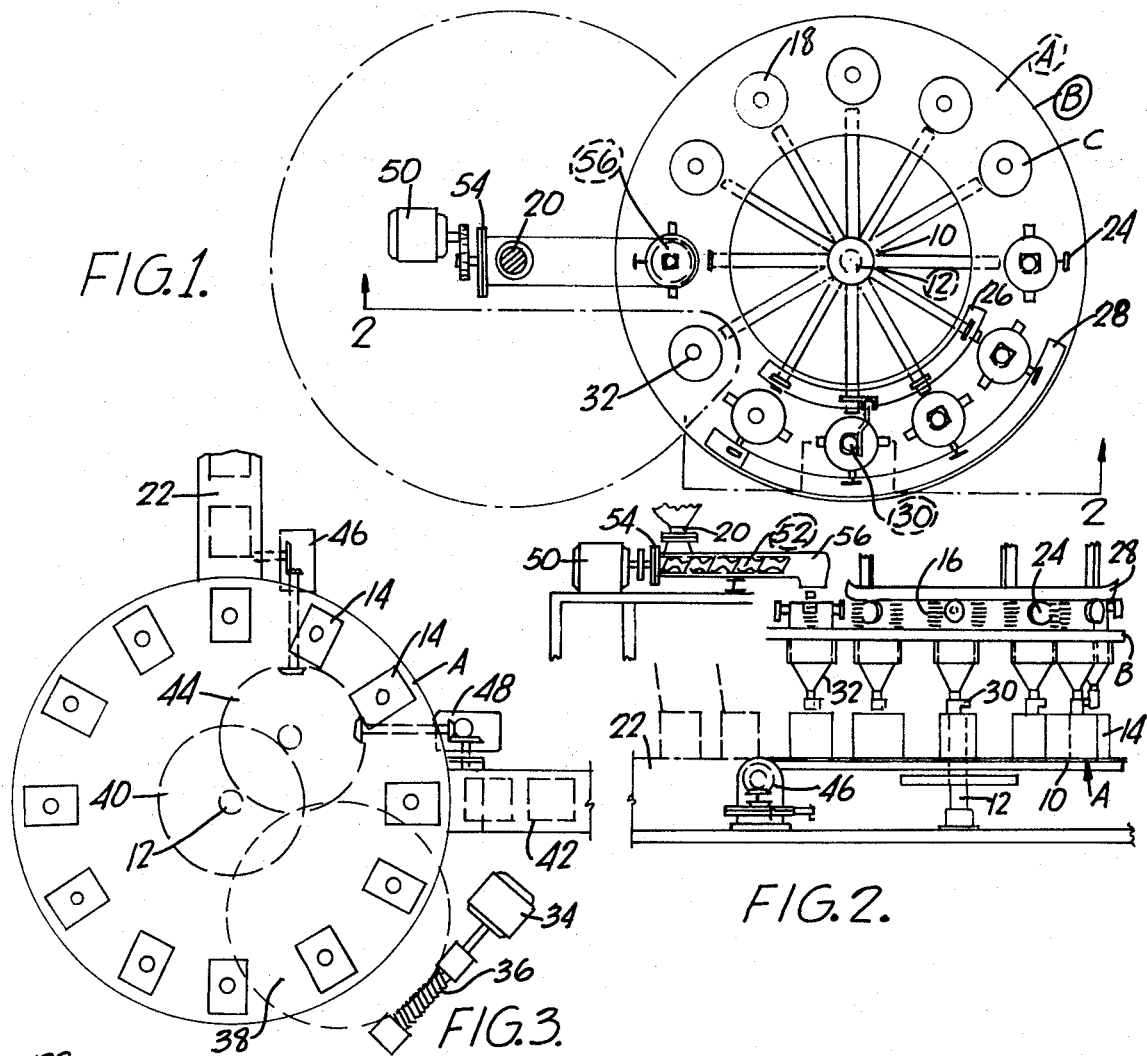
FIG.1.
FIG.2.
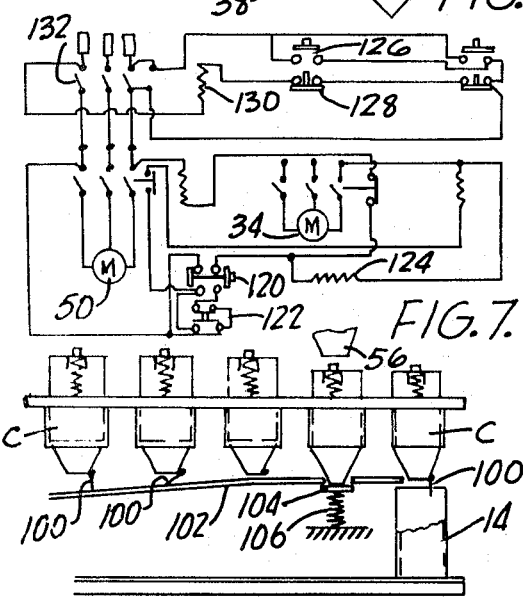
FIG.3.
FIG.4.
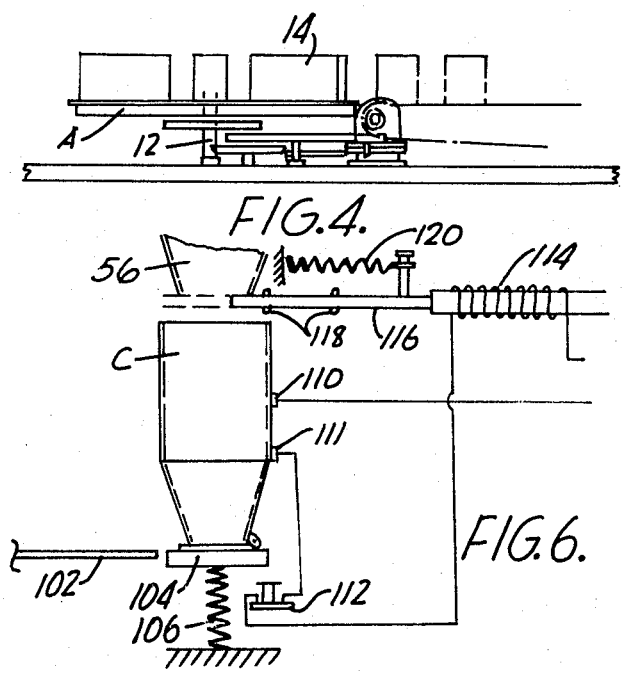
FIG.5.
FIG.6.
FIG.7.

AUTOMATIC LOADER FOR CARTONS

FIELD OF THE INVENTION

My invention relates to a machine for loading commodities and particularly relates to a machine to load bulk commodities such as lime, cement, fertilizer, feed, seed into cartons.

Heretofore, bulk commodities of the solid variety which are of fine grains such as those described above have been loaded into bags instead of cartons. However, cartons are more desirable because they are easier to handle and to stack and they preserve the contents better than bags. Cartons may be handled faster than bags, as well.

SUMMARY

Therefore, it is an object of my invention to provide a machine which will automatically load, weigh and dump the commodities into a carton, with an electrically actuated weighing device which will control the egress of the commodity from the delivery spout.

BRIEF DESCRIPTION OF THE DRAWINGS

FIG. 1 is a plan of a machine embodying my invention;

FIG. 2 is a side elevation of the automatic loading and packaging machine embodying my invention;

FIG. 3 is a section taken along the line 3—3 of FIG. 2.

FIG. 4 is another side elevation showing the driving mecanism for the turntable;

FIG. 5 is a fragmentary side elevation of an alternate embodiment of my invention;

FIG. 6 is a side elevation of the embodiment shown in FIG. 5, showing in detail the electrical means for weighing a pre-determined quantity of the commodity; and FIG. 7 is a schematic diagram of my invention.

DETAILED DESCRIPTION OF PREFERRED EMBODIMENTS:

In FIG. 1 a turntable 10 is mounted on a shaft 12. On this shaft are two revolving plates, which in one embodiment of my machine are each eight feet in diameter and contain twelve sections. The lower plate generally is designated as A, and the upper plate generally is designated as B. The plates A and B are fastened to the shaft 12 by suitable collars (not shown), and are arranged to revolve intermittently through a drive and controls as will be explained later.

The plate A contains twelve sections each carrying adjustable vertical rods (not shown) to hold the cartons 14 to be filled rigidly in place upon the plate. The plate B has a plurality of open top auxiliary tanks C, which are suspended by springs 16 within an equal number of openings 18 in the plate. A description of the operation of one of the auxiliary tanks will be given, since the operation is repeated continually by the other tanks as the purpose of having a large number of tanks is to expedite the handling of the material. An auxiliary tank C when empty stops under the delivery spout 20 of the reservoir tank and receives a weighed load of material. The auxiliary tank C then revolves away from the spout whereupon an empty carton is then positioned upon the lower plate A by a conveyor belt 22 indicated in dotted outline in FIG. 2.

The tank C carries a pair of wheels 24 which, as the tank continues to revolve, engages arcuate sections of rail 26 and 28 respectively, depressing the tank C into the open top of the carton 14 located immediately beow the tank. A slidable closure 30 which covers the outlet nozzle 32 of the tank C, is attached to the upper plate B, and as the tank is depressed, the nozzle 32 becomes uncovered, permitting the contents of the tank C to fall into the carton below.

At the end of its length the rail 26 and 28 turn up, and the tank C is elevated clear of the carton by the springs 16.

The turntable is revolved by the motor 34 through a worm 36 and a large driving gear 38 which meshes with the turntable gear 40.

A pair of carton conveyor belts 22 and 42 respectively, are also driven by motor 34 through a take-off gear 44 which also meshes with the driving gear 38, and a pair of right angle couplings 46 and 48 respectively. The entire apparatus is electrically controlled in order to achieve the proper sequence of operations. An electric motor 50 and a clutch 54 drives a feed screw conveyor 52 terminating in a delivery spout 56. The delivery spout is closed by a spring-loaded shutter (not shown). When the tank C is located under the spout 56 it is supported upon a platform of a scale which has been adjusted to close an electric switch. When tank C has been filled to the proper weight, the switch energizes the turntable motor 34 and motor 50 simultaneously de-energizes the feed screw, allowing the shutter to close.

The turntable 10 revolves one-twelfth of a revolution bringing the next tank C under the delivery spout 56 and resetting the switch. The turntable then stops, and the motor 50 commences to feed material into this next tank C, repeating the cycle.

Upon being filled, each carton 14 is diverted from the revolving turntable plate A onto a conveyor belt indicated in FIGS. 3 and 4 by the number 42.

The intermittent starting and stopping of the turntable jogs the cartons so as to settle and pack the contents therein.

In the drawings, I show the carton conveyor lines 22 and 42 being driven by a transmission linked to the turntable motor 34, so that the cartons will be conducted to and from the turntable in synchronism therewith at all speeds.

In an alternate modification of my invention shown in FIGS. 5 and 6, the depressing rails 26 and 28 and the outlet closures 30 of the tanks C are dispensed with. The bottom of each tank C is closed by a hinged trapdoor 100 which normally rides closed upon a bottom track 102. The track section 104 under the reservoir tank is separate and is supported upon a weighing scale 106, represented as a spring, to permit weighing the auxiliary tank C carried thereon.

When the tank C, with its trapdoor 100 closed, arrives upon the track section 104, it closes the electrical switch represented by the contacts 110. This closes an electric circuit comprising a scale switch 112 (normally closed), a solenoid 114, and the running controls of the drive motor.

Thereupon, the solenoid 114 becomes magnetized and retracts the shutter plate 116. When the shutter plate is moved horizontally aside upon its guide rollers 118, the filler nozzle 56 is exposed, and the commodity pours into the auxiliary tank C below. This continues until the weight of the contents depresses the scale sufficiently to open the scale switch 112, whereupon the solenoid 114 is demagnetized. At this point the return spring 120 restores the shutter plate under the nozzle 56.

The drive motor is then energized and the turntable is revolved to bring the filler tank 56 directly over the empty carton 14 to be filled. A gap in the track at this point permits the trapdoor 100 to swing open, discharging the weighed load of material into the carton below. After leaving the carton, the tank C, which is now empty, is revolved up on to the track 102 to close the trapdoor as shown in FIG. 5.

With the apparatus described above, I have been able to load lime or cement at the rate of 100 lbs., in as little as 2½ seconds, with a half-second interval for each partial revolution of the turntable. This corresponds roughly to a machine loading capacity of from 37 to 60 tons per hour.

FIG. 7 shows the circuit with feed motor 50 and drive motor 34 connected in circuit with positioning stop switch 120 weigher control and restart switch 122, solenoid cutoff 124, start switch 126, stop switch 128, coil 130 and main switch 132.

Although my invention has been described in considerable detail, such description is intended to be illustrative rather than limiting, since the invention may be variously embodied and the scope of the invention is to be determined as claimed.

I claim:
1. An automatic loading machine for bulk commodities comprising a main reservoir;
   a delivery spout receiving from said reservoir;
   means for feeding material to said spout for discharge;
   a platform, a spring on which said platform is elevated;
   a delivery tank mounted on said platform for receiving material from said reservoir to depress said platform;
   a valve in said delivery spout;
   an electric circuit including an electromagnet and two circuit controllers, one circuit controller controlled by said delivery tank whereby the electromagnet will be actuated to move said valve to an open position whereby the commodity within the spout may pour therefrom; and
   the second circuit controller being adapted to be actuated in order to release said electromagnet whereby the valve will close said spout when the platform is depressed by the weight of the tank and its contents.
2. The machine of claim 1 further including a ramp for keeping the valve closed until a selected location is reached.
3. The machine of claim 2 further including means to automatically remove the filled cartons.

* * * * *